US008105152B2

(12) United States Patent
Tamura et al.

(10) Patent No.: US 8,105,152 B2
(45) Date of Patent: Jan. 31, 2012

(54) GAME SYSTEM, GAME SYSTEM CONTROL METHOD AND INFORMATION STORAGE MEDIUM

(75) Inventors: Akinori Tamura, Minato-ku (JP); Takao Yamagishi, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 991 days.

(21) Appl. No.: 11/887,546

(22) PCT Filed: Dec. 19, 2005

(86) PCT No.: PCT/JP2005/023299
§ 371 (c)(1),
(2), (4) Date: Oct. 1, 2007

(87) PCT Pub. No.: WO2006/112087
PCT Pub. Date: Oct. 26, 2006

(65) Prior Publication Data
US 2009/0131169 A1    May 21, 2009

(30) Foreign Application Priority Data

Mar. 31, 2005  (JP) ................................. 2005-100367

(51) Int. Cl.
*A63F 13/00* (2006.01)
(52) U.S. Cl. ..................... 463/23; 463/7; 463/8; 463/37
(58) Field of Classification Search ................ 463/6, 23, 463/37, 7, 8
See application file for complete search history.

(56) References Cited

U.S. PATENT DOCUMENTS

| 4,207,087 | A | * | 6/1980 | Morrison et al. | ................. 463/9 |
| 6,149,523 | A |   | 11/2000 | Yamada et al. | |
| 6,652,376 | B1 | * | 11/2003 | Yoshida et al. | ................... 463/6 |
| 6,669,562 | B1 | * | 12/2003 | Shiino | ............................. 463/31 |
| 7,736,220 | B2 | * | 6/2010 | Mori | ................................ 463/6 |
| 2003/0109301 | A1 | * | 6/2003 | Chudley et al. | ................. 463/23 |
| 2004/0259614 | A1 | * | 12/2004 | Machida | ........................... 463/1 |

FOREIGN PATENT DOCUMENTS

| JP | 3153761 A | 9/1997 |
| JP | 2001145781 A | 5/2001 |

* cited by examiner

*Primary Examiner* — Peter DungBa Vo
*Assistant Examiner* — Jeffrey Wong
(74) *Attorney, Agent, or Firm* — Sughrue Mion, PLLC

(57) ABSTRACT

To provide a game system that enables a degree of difficulty of an occurrence of a predetermined game event to be changed depending on a degree of proficiency of a player in a game in which the predetermined event is made to occur when a controller is operated according to specific procedures. The present invention relates to a game system including one or more controllers. In the game system, a determining unit (52) determines whether or not a criterion operation data string has been inputted from the controller within a determination target period, a game event generation unit (58) generates a predetermined game event according to a result of the determination made by the determining unit (52), and the determining unit (52) changes a length of the determination target period based on a result of a past determination on at least one of the one or more controllers.

16 Claims, 8 Drawing Sheets

FIG.4

| ID | CRITERION OPERATION DATA STRING | SKILL EVENT |
|---|---|---|
| 1 | DOWN · RIGHT · △ | SPECIAL SKILL A |
| 2 | DOWN · RIGHT · UP · ○ · △ | SPECIAL SKILL A |
| 3 | DOWN · LEFT · □ | SPECIAL SKILL B |
| 4 | DOWN · LEFT · UP · ○ · □ | SPECIAL SKILL B |
| 5 | △ | PUNCH |
| 6 | □ | KICK |

FIG.5

| ID | DETERMINATION RESULT FLAG |
|---|---|
| 1 | 1 |
| 2 | 0 |
| 3 | 0 |
| 4 | 0 |
| 5 | 1 |
| 6 | 0 |

FIG.6

| ID | OCCURRENCE COUNT CONDITION |
|---|---|
| 1, 3 | EQUAL TO OR LARGER THAN 0 BUT LESS THAN 5 |
| 2, 4 | EQUAL TO OR LARGER THAN 5 |

FIG.7

| PID | SPECIAL SKILL EVENT | OCCURRENCE COUNT |
|---|---|---|
| P1 | SPECIAL SKILL A | 7 |
| P1 | SPECIAL SKILL B | 2 |
| P2 | SPECIAL SKILL A | 3 |
| P2 | SPECIAL SKILL B | 5 |

| ID | CRITERION OPERATION DATA STRING | SKILL EVENT |
|---|---|---|
| 1 | DOWN · RIGHT · △ | SPECIAL SKILL A |
| 2 | DOWN · LEFT · □ | SPECIAL SKILL B |
| 3 | △ | PUNCH |
| 4 | □ | KICK |

| OCCURRENCE COUNT CONDITION | LENGTH OF DETERMINATION TARGET PERIOD |
|---|---|
| EQUAL TO OR LARGER THAN 0 BUT LESS THAN 5 | T1 |
| EQUAL TO OR LARGER THAN 5 | T2 |

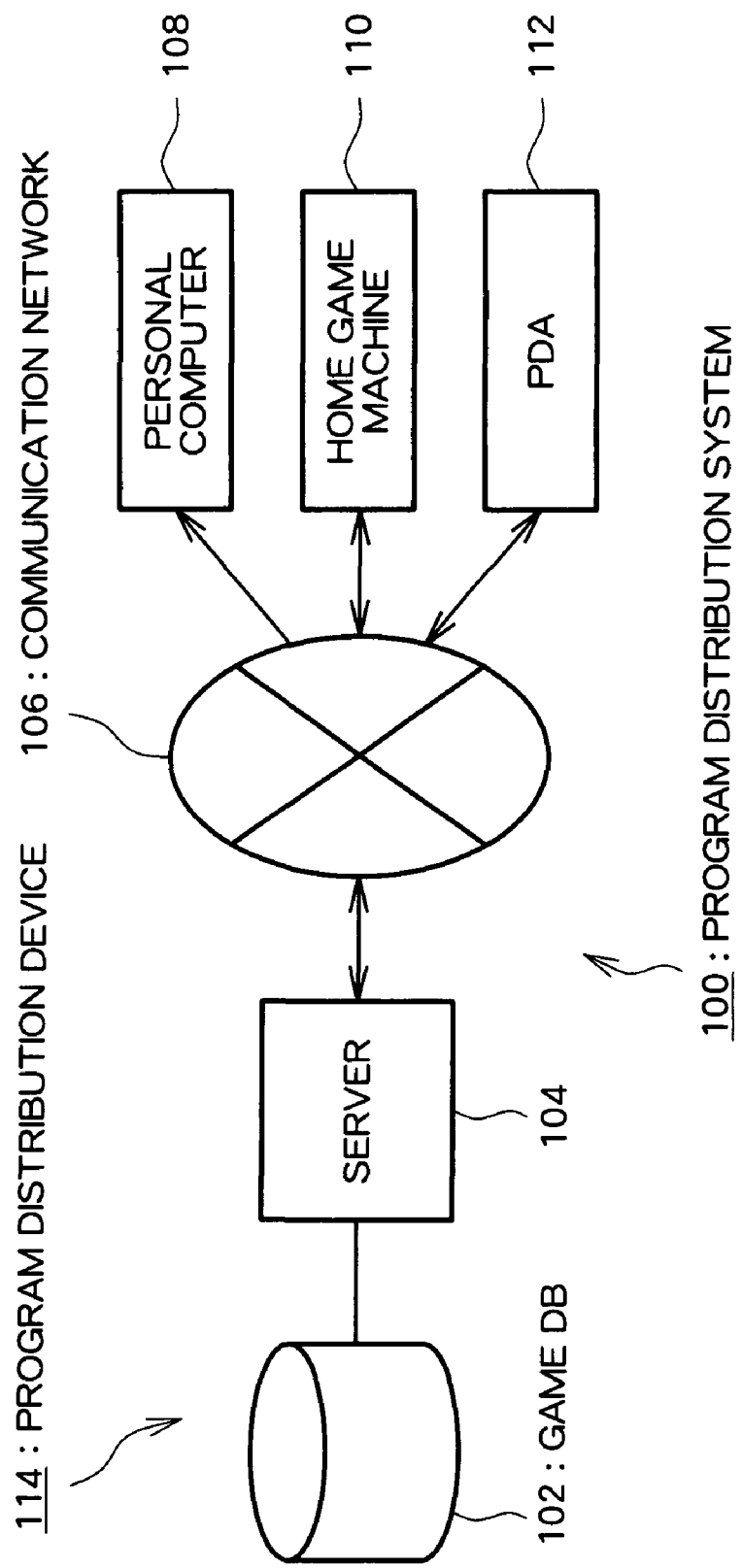

GAME SYSTEM, GAME SYSTEM CONTROL METHOD AND INFORMATION STORAGE MEDIUM

This application is related to co-pending application Ser. No. 11/887,542 which entered the National Stage on Oct. 1, 2007.

TECHNICAL FIELD

The present invention relates to a game system, a game system control method, and an information storage medium.

BACKGROUND ART

Such a game is known that when a controller is operated according to specific procedures, a game event capable of exerting a larger change on a state of a game is caused. For instance, as a fighting game in which a game character operated by a player engages in battle with a game character operated by a computer or an opponent player, there is known a fighting game in which a special skill event is caused, which involves the game character performing a special skill capable of exerting a greater damage on the opponent game character, when the controller is operated according to specific procedures.

[Patent Document 1] JP 3153761 B

DISCLOSURE OF THE INVENTION

Problems to be Solved by the Invention

In the game as described above, if a degree of proficiency of the player improves and the game event described above is easily caused, a fascination aspect of the game may be spoiled. For example, in the fighting game as described above, if the special skill event is easily caused, it becomes possible to inflict greater damage on the opponent game character easily, resulting in the spoiling of the fascination aspect of the fighting game.

The present invention has been made in view of the problems given above, and it is an object of the present invention to provide a game system, a game system control method, and an information storage medium that are capable of changing a degree of difficulty of an occurrence of a predetermined game event on the basis of a degree of proficiency of a player in a game in which the predetermined game event occurs when a controller is operated according to specific procedures.

Means for Solving the Problems

To solve the above-mentioned problems, according to one aspect of the present invention, there is provided a game system including one or more controllers, including: determining means for determining whether or not a criterion operation data string has been inputted from the one or more controllers within a determination target period; and game event generation means for generating a predetermined game event according to a result of the determination made by the determining means, in which the determining means executes a change of a length of the determination target period on the basis of a result of a past determination on at least one of the one or more controllers.

Further, according to another aspect of the present invention, there is provided a control method for a game system including one or more controllers, including: a determining step of determining whether or not a criterion operation data string has been inputted from the one or more controllers within the determination target period; and a game event generation step of generating a predetermined game event according to a result of the determination made in the determining step, in which the determining step includes the step of executing a change of the length of the determination target period on the basis of a result of a past determination on at least one of the one or more controllers.

Further, according to still another aspect of the present invention, there is provided a program for causing a computer such as a home game machine, a commercial game machine, a portable game machine, a mobile phone, a personal computer, or a server computer to function as a game system including one or more controllers, and also to function as: determining means for determining whether or not a criterion operation data string is inputted from the one or more controllers within the determination target period; and game event generation means for generating a predetermined game event according to a result of the determination made by the determining means, in which the determining means executes a change of the length of the determination target period on the basis of the result of the past determination on at least one of the one or more controllers.

Still further, according to still another aspect of the present invention, there is provided a computer readable information storage medium storing the program described above. Yet further, a program distribution device according to the present invention is a program distribution device including an information storage medium storing the program described above, for reading the program from the information storage medium and distributing the program. Furthermore, a program distribution method according to the present invention is a program distribution method, while using an information storage medium storing the program, for reading the program from the information storage medium and distributing the program.

The present invention relates to a game system including one or more controllers. In the present invention, it is determined whether or not the criterion operation data string is inputted from the one or more controllers within the determination target period, and the predetermined game event occurs according to the result of the determination. Particularly, in the present invention, the length of the determination target period is changed based on the result of the past determination on at least one of the one or more controllers. According to the present invention, the degree of difficulty of the occurrence of the predetermined game event can be changed base on the degree of proficiency of the player.

In one example of the present invention, the determining means may execute, when determining whether or not the criterion operation data string has been inputted from one of the one or more controllers, the change on the basis of a result of a past determination on the controller.

In another example of the present invention, the determining means may execute, when determining whether or not the criterion operation data string has been inputted from one of the one or more controllers, the change on the basis of a result of a past determination on other controller among the one or more controllers.

In still another example of the present invention, the determining means may execute the change on the basis of the number of times the game event generation means has generated the predetermined game event according to the result of the determination on at least one of the one or more controllers.

BRIEF DESCRIPTION OF THE DRAWINGS

FIG. 4 is a diagram showing an example of a criterion operation data string table.

FIG. 5 is a diagram showing an example of a determination result table.

FIG. 6 is a diagram showing an example of an occurrence count condition table.

FIG. 7 is a diagram showing an example of an occurrence count table.

FIG. 14 is a diagram showing a whole structure of a program distribution system according to another embodiment of the present invention.

BEST MODE FOR CARRYING OUT THE INVENTION

An in-depth description of an example of an embodiment of the present invention will hereinafter be made based on the drawings.

Figure 1:
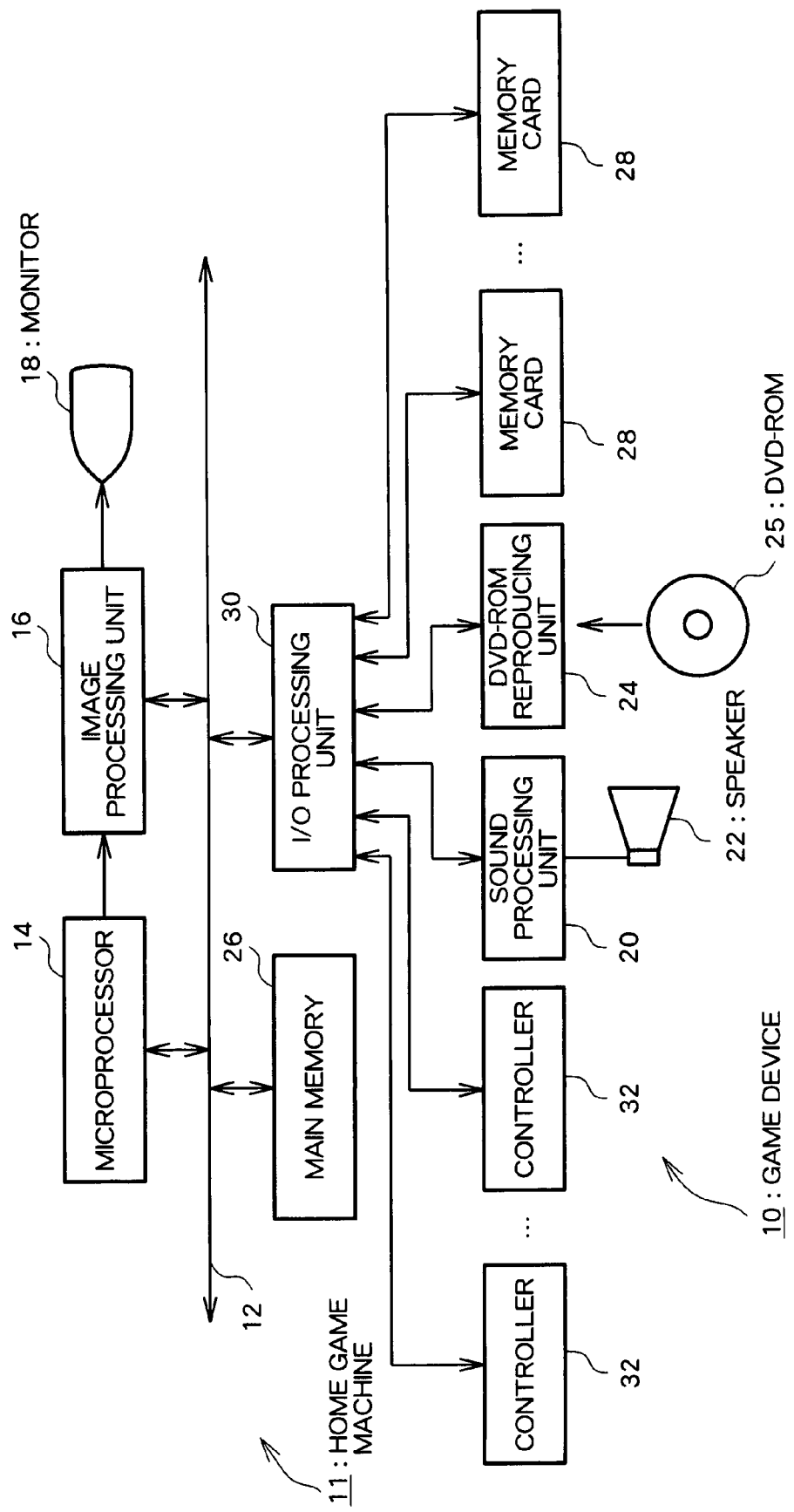
FIG. 1 is a diagram showing a hardware structure of a game device according to an embodiment of the present invention.

FIG. 1 is a diagram illustrating a hardware structure of a game device (game system) according to the embodiment of the present invention. A game device 10 illustrated in FIG. 1 has a structure in which a DVD-ROM 25 and memory cards 28 as information storage mediums are inserted into a home game machine 11, and a monitor 18 and a speaker 22 are connected to the home game machine 11. For example, a domestic TV receiving set is used for the monitor 18, and a built-in speaker thereof is used for the speaker 22.

The home game machine 11 is a well-known computer game system comprising a bus 12, a microprocessor 14, an image processing unit 16, a sound processing unit 20, a DVD-ROM reproducing unit 24, a main memory 26, an input/output (I/O) processing unit 30, and controllers 32. An enclosure accommodates the components other than the controllers 32.

The bus 12 is used for exchanging addresses and/or data among the respective units of the home game machine 11. The microprocessor 14, the image processing unit 16, the main memory 26, and the I/O processing unit 30 are connected to each other via the bus 12 so as to be communicable with each other.

The microprocessor 14 controls the individual units of the home game machine 11 on the basis of an operating system (OS) stored in a ROM (not shown), a program read from the DVD-ROM 25, and the data read from the memory card 28. The main memory 26 comprises, for example, a RAM, and the program read from the DVD-ROM 25 and the data read from the memory card 28 are written in the main memory 26 if necessary. The main memory 26 is also employed as a work memory for the microprocessor 14.

The image processing unit 16, comprising a VRAM, renders a game screen into the VRAM based on the image data sent from the microprocessor 14. Then, the image processing unit 16 converts a content thereof into video signals and outputs the video signals to the monitor 18 at predetermined times.

The I/O processing unit 30 is an interface used for the microprocessor 14 to access the sound processing unit 20, the DVD-ROM reproducing unit 24, the memory card 28, and the controller 32. The sound processing unit 20, the DVD-ROM reproducing unit 24, the memory card 28, and the controller 32 are connected to the I/O processing unit 30.

The sound processing unit 20, comprising a sound buffer, reproduces and outputs, via the speaker 22, various sound data such as game music, game sound effects, messages or the like that are read from the DVD-ROM 25 and stored in the sound buffer.

The DVD-ROM reproducing unit 24 reads the program stored on the DVD-ROM 25 in accordance with an instruction given from the microprocessor 14. It is to be noted that the DVD-ROM 25 is employed for supplying the program to the home game machine 11. However, any of various other information storage medium such as CD-ROMs, ROM cards or the like may also be used. Further, the program may also be supplied to the home game machine 11 from a far-off area via a data communication network such as the Internet or the like.

The memory card 28 comprises a nonvolatile memory (e.g., an EEPROM). The home game machine 11 has a plurality of memory card slots into which the memory cards 28 are inserted, and the plurality of memory cards 28 can be simultaneously inserted. The memory card 28 is constructed so that the memory card 28 can be inserted into and removed from the memory card slot, and is employed for storing various game data such as save data or the like.

The controller 32 is a general-purpose operation input means used for a player to input a variety of game operations. When the controller 32 is operated, operation data indicating a content of the operation is supplied to the microprocessor 14. More specifically, statuses of the respective units of the controller 32 are scanned at an interval of a fixed period (e.g., every ¹⁄₆₀ sec) by the I/O processing unit 30. Then, operation data (operation signal) representing a result of the scan is transferred via the bus 12 to the microprocessor 14. The microprocessor 14 determines, based on the operation data, the game operation of the player. The home game machine 11 is configured to be connectable with the plurality of controllers 32, and configured so that the game is controlled based on the operation data inputted from the respective controllers 32.

Figure 2:
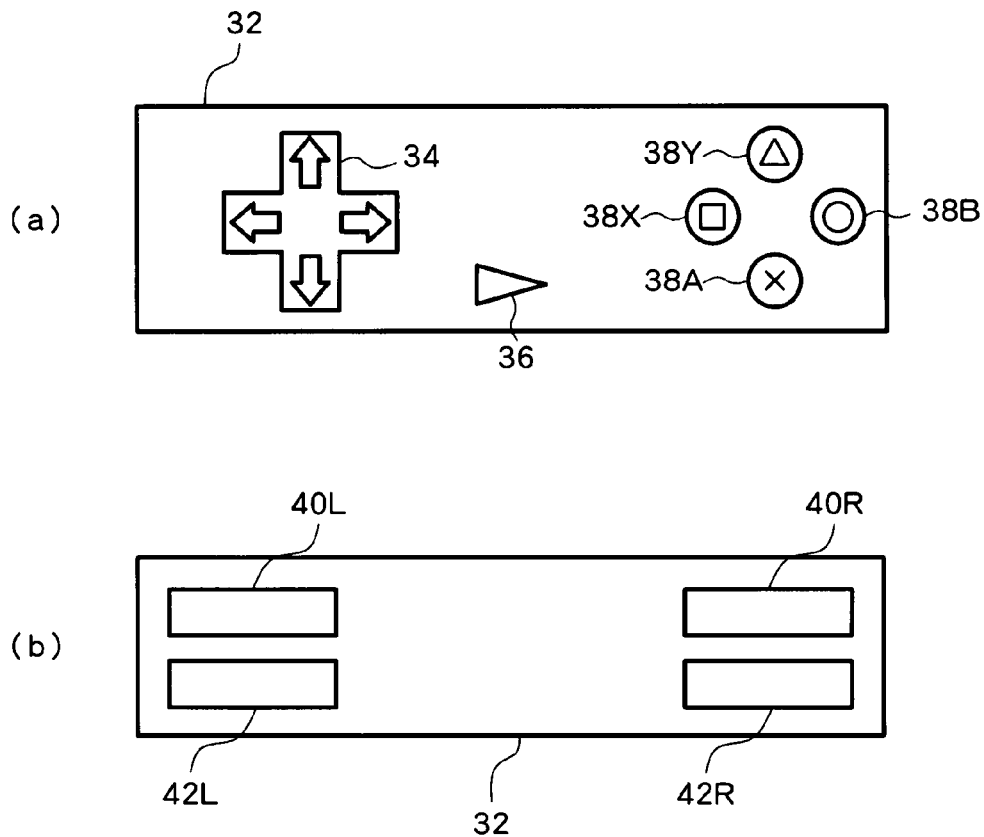
FIG. 2 are diagrams showing an example of a controller.

FIG. 2 are diagrams showing an example of the controller 32. The controller 32 shown in FIG. 2 is a general-purpose game controller. As illustrated in FIG. 2(*a*), the surface of the controller 32 is provided with a direction button 34, a start button 36, and buttons 38X, 38Y, 38A, and 38B. The surfaces of the buttons 38X, 38Y, 38A, and 38B are marked with symbols of "square", "triangle", "cross", and "circle", respectively. Further, as illustrated in FIG. 2(*b*), the buttons 42L, 42R, formed on the top surface on the left and right sides thereof closer to the front surface, and the buttons 40L, 40R, similarly formed but closer to the rear surface. The direction button 34 takes a cross-shape and is normally used for designating a moving direction of a character or a cursor. The start button 36 is a small-sized push button having a triangular shape and is normally used for starting or forcibly terminating the game. The buttons 38X, 38Y, 38A, 38B, 40L, 40R, 42L, and 42R are used for other game operations.

In the game device 10 having the hardware structure as described above, a game program read from the DVD-ROM 25 is executed by the microprocessor 14 to provide a fighting game.

The fighting game includes a 1-player mode and a 2-player mode. The 1-player mode is a game mode for engaging in battle a game character operated by the player (which will hereinafter be referred to as operation object character) and a game character operated by the computer. Further, the 2-player mode is a game mode for engaging in battle the operation object character and a game character operated by an opponent player. The following discussion proceeds in a way that exemplifies the 2-player mode.

A first operation object character and a second operation object character are displayed on the game screen for the 2-player mode. The first operation object character is defined as an operation object of the first player. The first operation object character performs a variety of skills based on contents of operations of a first controller (controller 32 used by the first player). The second operation object character is defined as an operation object of the second player. The second operation object character performs the variety of skills based on contents of operations of a second controller (controller 32 used by the second player).

Those operation object characters perform, when the direction button 34 and the buttons 38B, 38×, and 38Y of each controller 32 are operated in specified procedures, special skills capable of exerting greater damages on the opponent than by normal skills (such as punching and kicking). In other words, in the game device 10, when a specific criterion operation data string is inputted by each controller 32, such a special skill event occurs to cause the operation object character to perform the special skill.

In particular, in the fighting game according to this embodiment, it is possible to differentiate a degree of difficulty of the occurrence of the special skill event for every player on the basis of a degree of proficiency of individual players. To be specific, the number of occurrences of the special skill events is counted on a player-by-player basis, and, for a player with the event occurrence count reaching a predetermined count, the operation procedures (criterion operation data string) for causing the occurrence of the special skill event are changed to more complicated procedures. In other words, the player with more occurrences of the special skill events is determined to be a player having a high degree of proficiency, and the degree of difficulty of the occurrence of the special skill event is thus increased. As a result, for example, even when the players, who are different in terms of degrees of proficiency, engage in battle, the battle can be enlivened.

Figure 3:
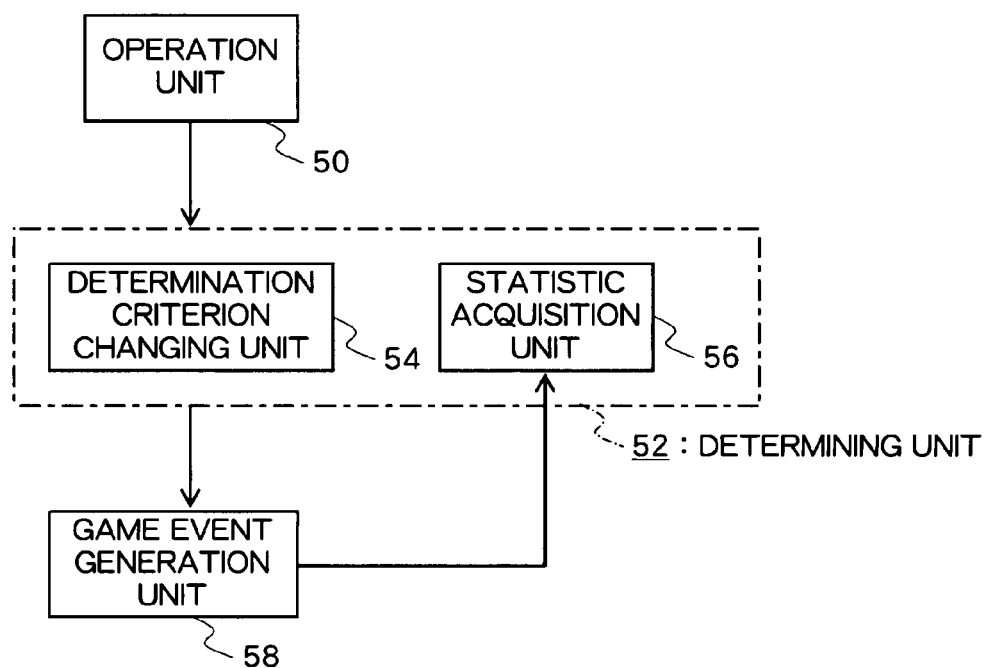
FIG. 3 is a functional block diagram of the game device according to the embodiment of the present invention.

Given herein is a description of a functional configuration of the game device 10. FIG. 3 mainly shows functional blocks related to the present invention among the functional blocks realized in the game device 10. As shown in FIG. 3, the game device 10 includes an operation unit 50, a determining unit 52, a statistic acquisition unit 56, and a game event generation unit 58. Those functions are realized by the microprocessor 14 executing the program supplied via the DVD-ROM 25.

[1. Operation Unit]

The operation unit 50 is realized mainly with the controller 32 and the I/O processing unit 30. The operation data inputted from the operation unit 50 is held in a key buffer.

[2. Determining Unit]

The determining unit 52 determines whether or not the operation data string corresponding to the criterion operation data string is inputted from the operation unit 50 within a determination target period. Note that the determination target period is defined as, e.g., a period from a predetermined time ago up to the present time.

The determining unit 52 stores a criterion operation data string table as illustrated in FIG. 4, for example. The criterion operation data string table illustrated in FIG. 4 contains an ID field, a criterion operation data string field, and a skill event field. The ID field stores identification information for uniquely identifying the criterion operation data string. The criterion operation data string field stores information specifying the criterion operation data string. The criterion operation data string includes a single item or a plurality of items of operation data, and indicates the operation procedures for the controller 32. In the example of FIG. 4, the criterion operation data string having ID "1" is an operation data string obtained by combining the operation data corresponding to a downward instructing portion of the direction button 34, the operation data corresponding to a rightward instructing portion of the direction button 34, and the operation data corresponding to the button 38Y in the stated order. The skill event field stores information indicating the skill event that occurs when the criterion operation data string is inputted from the operation unit 50. As shown in FIG. 4, according to this embodiment, the special skill event includes a special skill A event and a special skill B event. In other words, two types of skills such as the special skill A and the special skill B are prepared as the special skills that can be performed by the operation object character.

Further, the determining unit 52 stores a determination result table as illustrated in FIG. 5, for example. The determination result table shown in FIG. 5 contains an ID field and a determination result flag field. The ID field stores an ID of the criterion operation data string. The determination result flag field stores information indicating a result of the determination made by the determining unit 52. To be specific, when determining that the criterion operation data string is inputted, "1" is stored therein. Further, when determining that the criterion operation data string is not inputted, "0" is stored therein. It is to be noted that the determination result table may also be provided for every player (each controller 32).

[3. Determination Criterion Changing Unit]

The determining unit 52 includes a determination criterion changing unit 54. The determination criterion changing unit 54 changes, based on the results of the determinations made in the past by the determining unit 52, the criterion operation data string to be inputted for causing the occurrence of the special skill event (predetermined game event). More specifically, the determination criterion changing unit 54 implements such a change based on a statistic acquired by the statistic acquisition unit 56 that will be explained later on.

The determination criterion changing unit 54 stores an occurrence count condition table as illustrated in FIG. 6, for example. The occurrence count condition table shown in FIG. 6 contains an ID field and an occurrence count condition field. The ID field stores an ID of the criterion operation data string. The occurrence count condition field stores information indicating a condition on the number of the occurrence of the special skill event (occurrence count condition).

When it is determined that the criterion operation data string corresponding to the special skill event is inputted, if the occurrence count condition associated with the criterion operation data string is satisfied, the determination criterion changing unit 54 permits the special skill event to occur. On the other hand, when it is determined that the criterion operation data string corresponding to the special skill event is inputted, if the occurrence count condition associated with the criterion operation data string is not satisfied, the determination criterion changing unit 54 restricts the occurrence of the special skill event.

Note that the criterion operation data string specified by ID"1" and the criterion operation data string specified by ID"2" that contains more items of operation data, are associated with the special skill A event in this embodiment (see FIG. 4). Further, an occurrence count condition "equal to or larger than 0 but less than 5" is associated with the criterion operation data string specified by ID"1", and an occurrence count condition "equal to or larger than 5" is associated with the criterion operation data string specified by ID"2" (see FIG. 6). Therefore, a more complicated operation is required for causing the occurrence of the special skill A event for the player who has caused the special skill A event to occur five or more times. Similarly, the criterion operation data string specified by ID"3" and the criterion operation data string specified by ID"4" that contains more items of operation data, are associated with the special skill B event (see FIG. 4). Further, the occurrence count condition "equal to or larger than 0 but less than 5" is associated with the criterion operation data string specified by ID"3", and the occurrence count condition "equal to or larger than 5" is associated with the criterion operation data string specified by ID"4" (see FIG. 6). Hence, a more complicated operation is required for causing the occurrence of the special skill B event for the player who has caused the special skill B event to occur five or more times.

[4. Statistic Acquisition Unit]

The determining unit 52 includes the statistic acquisition unit 56. The statistic acquisition unit 56 acquires a statistic related to the results of the past determinations (past determination statuses) by the determining unit 52. The "statistic related to the results of the past determinations by the determining unit 52" is, for example, the occurrence count of the special skill event. Furthermore, for instance, the statistic may also be a determination count by which the determining unit 52 has determined that each criterion operation data string has been inputted.

In this embodiment, the statistic acquisition unit 56 retains an occurrence count table as illustrated in FIG. 7, for example. The occurrence count table shown in FIG. 7 contains a PID field, a special skill event field, and an occurrence count field. The PID field stores identification information for uniquely identifying the player (or the controller 32). The special skill event field stores information indicating a type of the special skill event. The occurrence count field stores information indicating the number of occurrences of the special skill event caused by the player (or an input from the controller 32 thereof). The occurrence count table retains the occurrence count of each special skill event for every player (every controller 32).

Note that results of the acquisitions by the statistic acquisition unit 56, i.e., contents of the occurrence count table may be initialized each time the game is finished (each time a fight ends in the case of the battle game), for example. Moreover, for instance, the contents of the occurrence count table may be initialized when a predetermined period of time elapses since the last play time, or may be initialized when plays are held a predetermined number of times (matches or battles are conducted a predetermined number of times). Further, for example, the contents of the occurrence count table may be stored in the memory card 28 to be reflected in the games from the next game onward. In the latter case, the criterion operation data string may be prevented from being changed in the middle of the game and instead changed at the start of the game, based on the result of the acquisition in the last game or on the results of the acquisitions in the games up to the last time.

[5. Game Event Generation Unit]

The game event generation unit 58 generates the skill event according to the result of the determination made by the determining unit 52. Specifically, when it is determined that the criterion operation data string is inputted the game event generation unit 58 causes the skill event corresponding to the criterion operation data string to occur. The skill event is defined as a game event which makes the operation object character perform the skill corresponding to the criterion operation data string. When the skill event occurs, motion data (animation data) of the skill starts to be reproduced, and a scene of how the operation object character performs the skill is displayed on the game screen.

Figure 8:
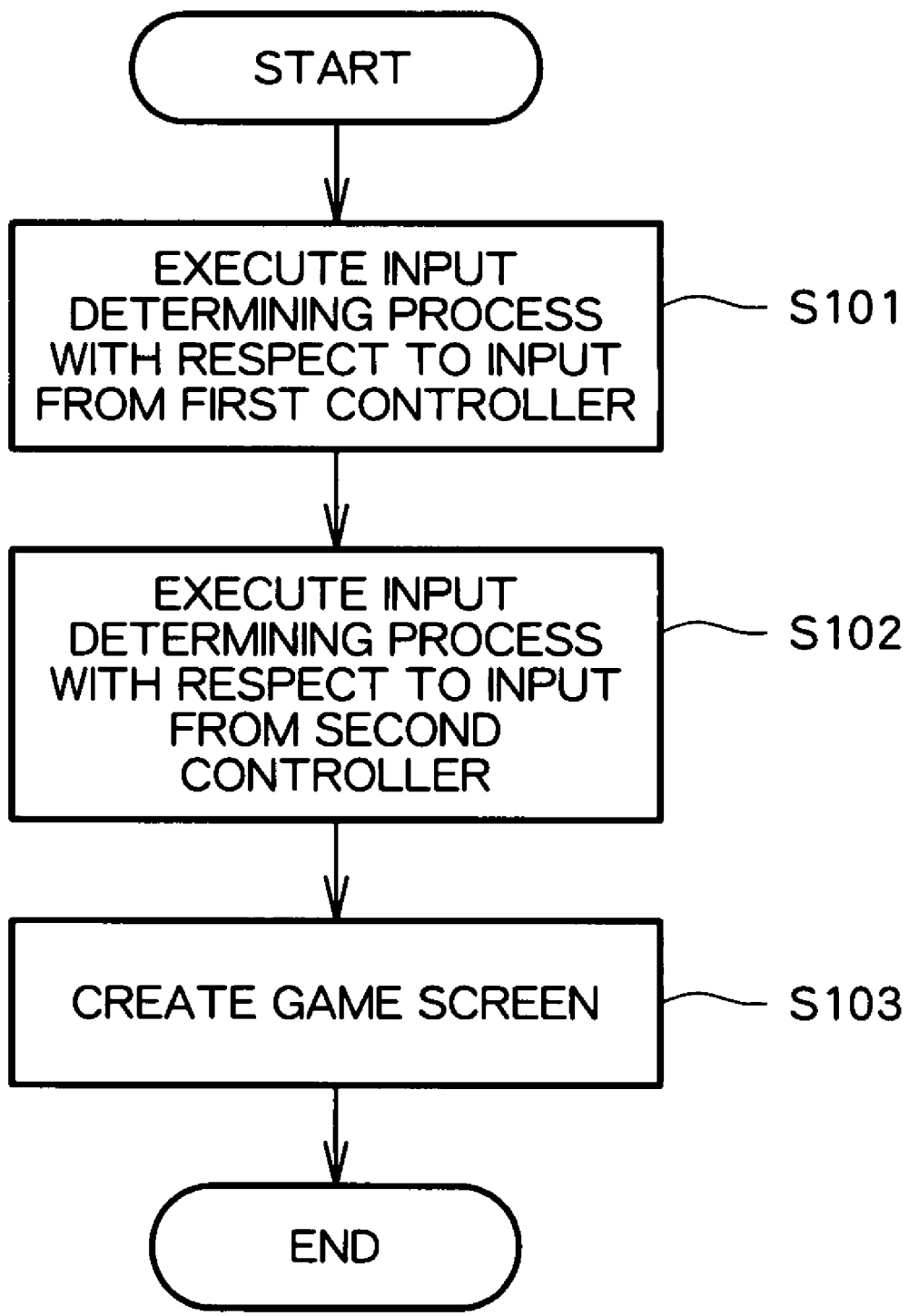
FIG. 8 is a flowchart showing a game process.

Explained herein is a game process executed by the game device 10 at an interval of a predetermined period of time (e.g., every 1/60 sec). FIG. 8 is a flowchart showing the game process.

Figure 9:
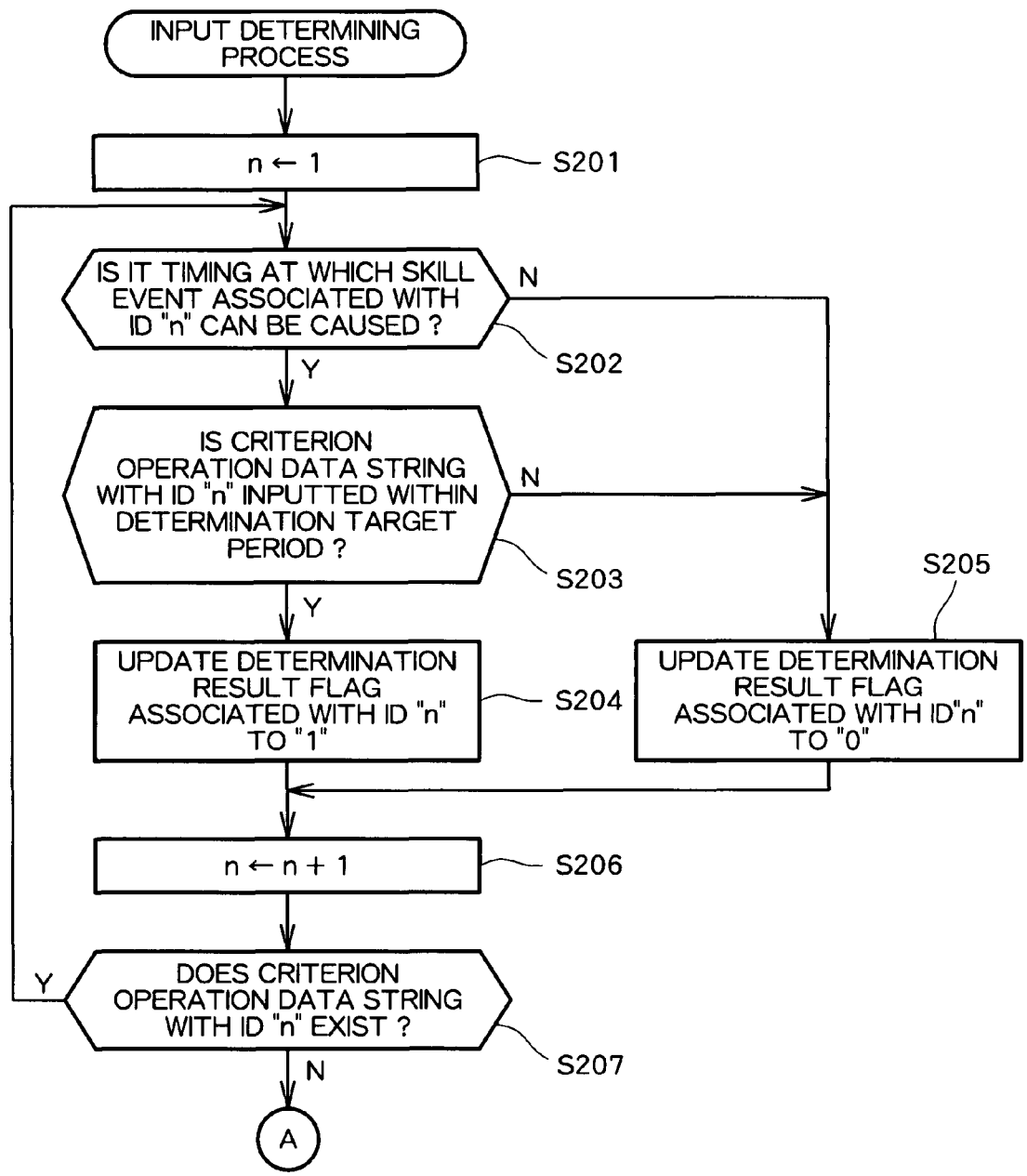
FIG. 9 is a flowchart showing an input determining process.
Figures 10, 11, 12:
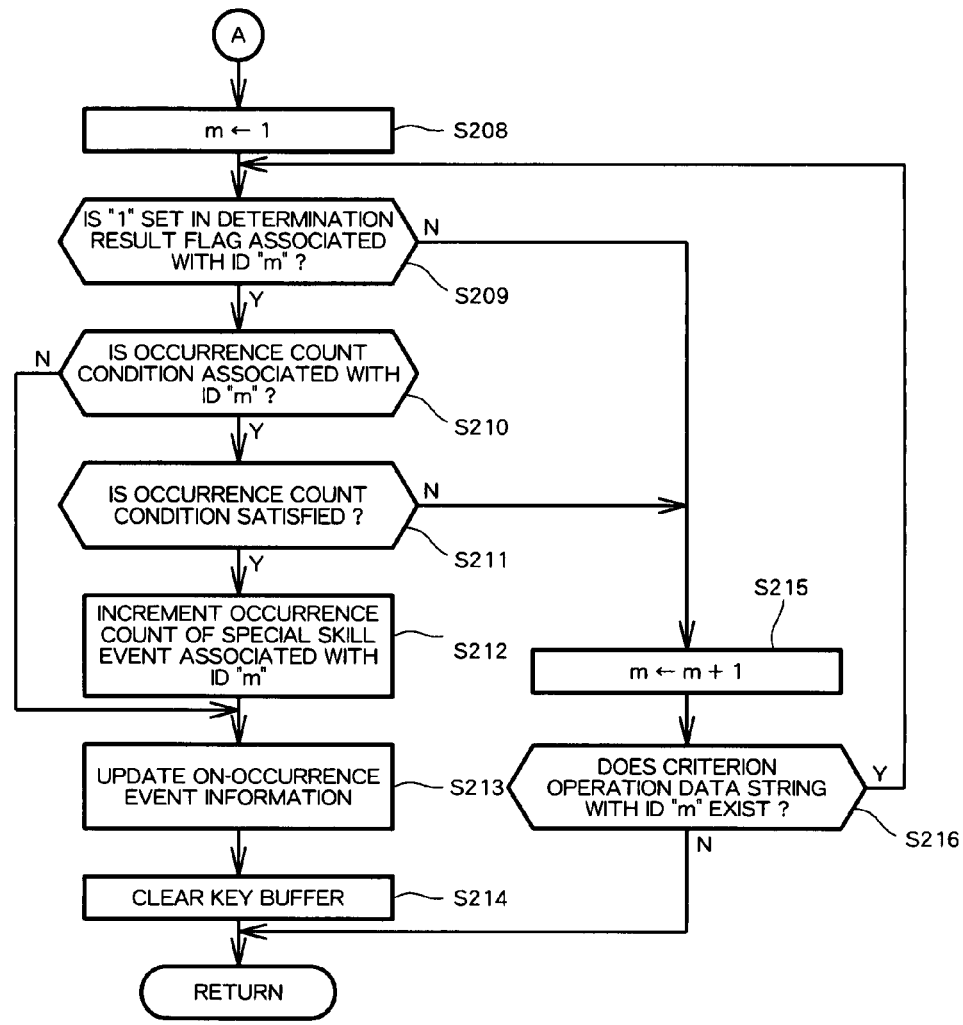
FIG. 10 is a flowchart showing the input determining process.
FIG. 11 is a diagram showing another example of the criterion operation data string table.
FIG. 12 is a diagram showing an example of the occurrence count condition table.

As illustrated in FIG. 8, in the game process, first, an input determining process is executed with respect to an input from the first controller (S101). FIGS. 9 and 10 are flowcharts each showing the input determining process.

As illustrated in FIG. 9, in the input determining process, first, a variable n is initialized to "1" (S201).

After that, the determining unit 52 determines whether or not it is the time at which the skill event associated with ID"n" can be caused (S202). In this embodiment, when a certain skill event occurs, i.e., when the reproduction of the motion data (animation data) of the certain skill is started, the occurrence of the skill event having a predetermined relationship with the certain skill event is restricted. Thus, the determining unit 52 determines whether the skill event associated with ID"n" can be caused or not.

The determining unit 52, when determining that it is not the timing at which the skill event associated with ID"n" can be caused, updates the determination result flag field associated with ID"n" to "0" (S205).

On the other hand, the determining unit 52, when determining that it is the time at which the skill event associated with ID"n" can be caused, determines whether or not the operation data string corresponding to the criterion operation data string specified by ID"n" is inputted within the determination target period (S203). To be specific, the determining unit 52 acquires the criterion operation data string specified by ID"n" from the criterion operation data string table. Then, the determining unit 52 refers to the content of the key buffer corresponding to the controller 32 set as an object of the input determining process (which will hereinafter be referred to as object controller) to determine whether the criterion operation data string is contained in the criterion operation data strings inputted during a period from a predetermined time ago up to the present time. If the input times of two consecutive items of operation data are apart from each other by a predetermined period of time (a criterion interval) or more, however, the determining unit 52 does not determine that the acquired criterion operation data string is contained therein.

The determining unit 52 updates, when it is determined that the criterion operation data string specified by ID"n" is inputted, the determination result flag field associated with ID"In" to "1" (S204). On the other hand, when determining that the criterion operation data string specified by ID"n" is not inputted, the determining unit 52 updates the determination result flag field associated with ID"n" to "0" (S205).

After that, the determining unit 52 increments the variable n (S206), and determines whether or not the criterion operation data string specified by ID"n" exists (S207). When it is determined that the criterion operation data string specified by ID"n" exists, the processes of S202 through S207 are executed. Thus, in this embodiment, it is determined whether the criterion operation data string is inputted from the operation unit 50 or not, and the result of this determination is stored in the determination result table.

On the other hand, if it is determined that the criterion operation data string specified by ID"n" does not exist, i.e., when the processes described above are executed with respect to all of the criterion operation data strings, a variable m is initialized to "1" (S208). After that, the determining unit 52 determines whether or not the value of the determination result flag field associated with ID"m" is "1" (S209).

When the value of the determination result flag field is determined to be "1", the determination criterion changing unit 54 determines whether or not the occurrence count condition is associated with the criterion operation data string specified by ID"m" (S210). This determination is made based on the occurrence count condition table. It is to be noted that the occurrence count condition is associated with only the special skill event in this embodiment, and hence it may be determined whether or not the skill event associated with ID"m" is the special skill event (special skill A event or special skill B event).

When it is determined that the occurrence count condition is not associated therewith, the game event generation unit 58 updates on-occurrence event information (S213). The on-occurrence event information is information indicating a type of the skill event that is being caused, and is stored in the main memory 26. The game event generation unit 58 updates the on-occurrence event information so as to specify the skill event associated with ID"m".

On the other hand, when determining that the occurrence count condition is associated therewith, the determination criterion changing unit 54 determines whether or not the occurrence count condition is satisfied (S211). Specifically, the determination criterion changing unit 54 refers to the occurrence count table and the occurrence count condition table, thereby determining whether or not the occurrence count associated with a combination of the player corresponding to the object controller and the type of the special skill event associated with ID"m" satisfies the occurrence count condition associated with ID"m".

In the case where it is determined that the occurrence count condition is satisfied, in the occurrence count table, the statistic acquisition unit 56 increments the value of the occurrence count field associated with the combination of the player corresponding to the object controller and the special skill event associated with ID"m" (S212). After that, the game event generation unit 58 updates the on-occurrence event information so as to specify the special skill event associated with ID"m" (S213).

After executing the process of S213, the content of the key buffer corresponding to the object controller is cleared (S214), thus completing the input determining process.

In contrast, when it is determined in S209 that the value of the determination result flag field is not "1", or when it is determined in S211 that the occurrence count condition is not satisfied, the variable m is incremented (S215). Then, it is determined whether or not the criterion operation data string specified by ID"m" exists (S216). If the criterion operation data string specified by ID"m" exists, the process of S209 is executed. On the other hand, if the criterion operation data string specified by ID"m" does not exist, the input determining process is terminated.

Note that the processes of S210 and S211 may be executed before executing the process of S203 in the case where it is determined in S202 that it is the time at which the skill event associated with ID"n" can be caused. In this case, if it is determined that the occurrence count condition is not associated with ID"n", the process of Step S203 may be executed. Further, when it is determined that the occurrence count condition is not satisfied, the process of Step S205 may be executed.

When the input determining process with respect to the input from the first controller is completed, next, the input determining process with respect to the input from the second controller is executed (S102). The input determining process with respect to the input from the second controller is executed in the same way as the input determining process with respect to the input from the first controller. Note that the process of this step is omitted in the case of the 1-player mode.

When the input determining processes with respect to the inputs from the first controller and the second controller are completed, the game event generation unit 58 creates the game screen in the VRAM (S103). For example, the game event generation unit 58 creates, based on the on-occurrence event information retained in the main memory 26, the game screen on which how the first operation object character and the second operation object character perform the skills is displayed. The game screen created in the VRAM is output to the monitor 18 at the predetermined timing.

Note that the game processes described above are realized by the microprocessor 14 executing the game program read from the DVD-ROM 25.

As discussed above, according to the game device 10, the operation procedures for causing the occurrence of the special skill event (special skill A event and special skill B event) can be changed based on the degree of proficiency of the player. In other words, the degree of difficulty of the occurrence of the special skill event can be changed based on the degree of proficiency of the player. As a result, it becomes possible to prevent a fascination aspect of the game from being spoiled due to the fact that the special skill event is caused to occur easily. For instance, even when the players are different in their degrees of proficiency, a fervent battle can be held therebetween.

Note that in the above description, the degree of difficulty of the occurrence of the special skill event is varied by changing the criterion operation data string for causing the occurrence of the special skill event. However, the degree of difficulty of the occurrence of the special skill event may also be varied by changing a length of the determination target period. To be specific, with respect to the player who has caused the special skill A event five or more times, the time for conducting the operation procedures for causing the occurrence of the special skill A event may be reduced by shortening the determination target period. Similarly, regarding the player who has caused the special skill B event five or more times, the time for conducting the operation procedures for causing the occurrence of the special skill B event may be reduced by shortening the determination target period.

In this case, in the criterion operation data string table, as illustrated in FIG. 11, a single criterion operation data string may be associated with one special skill event.

Further, as illustrated in FIG. 12, the occurrence count condition table may be structured so that the occurrence count condition is associated with the length of determination target period. Note that T1 and T2 are predetermined constants each representing the length of time in FIG. 12, where T2 represents a time shorter than T1.

Figure 13:
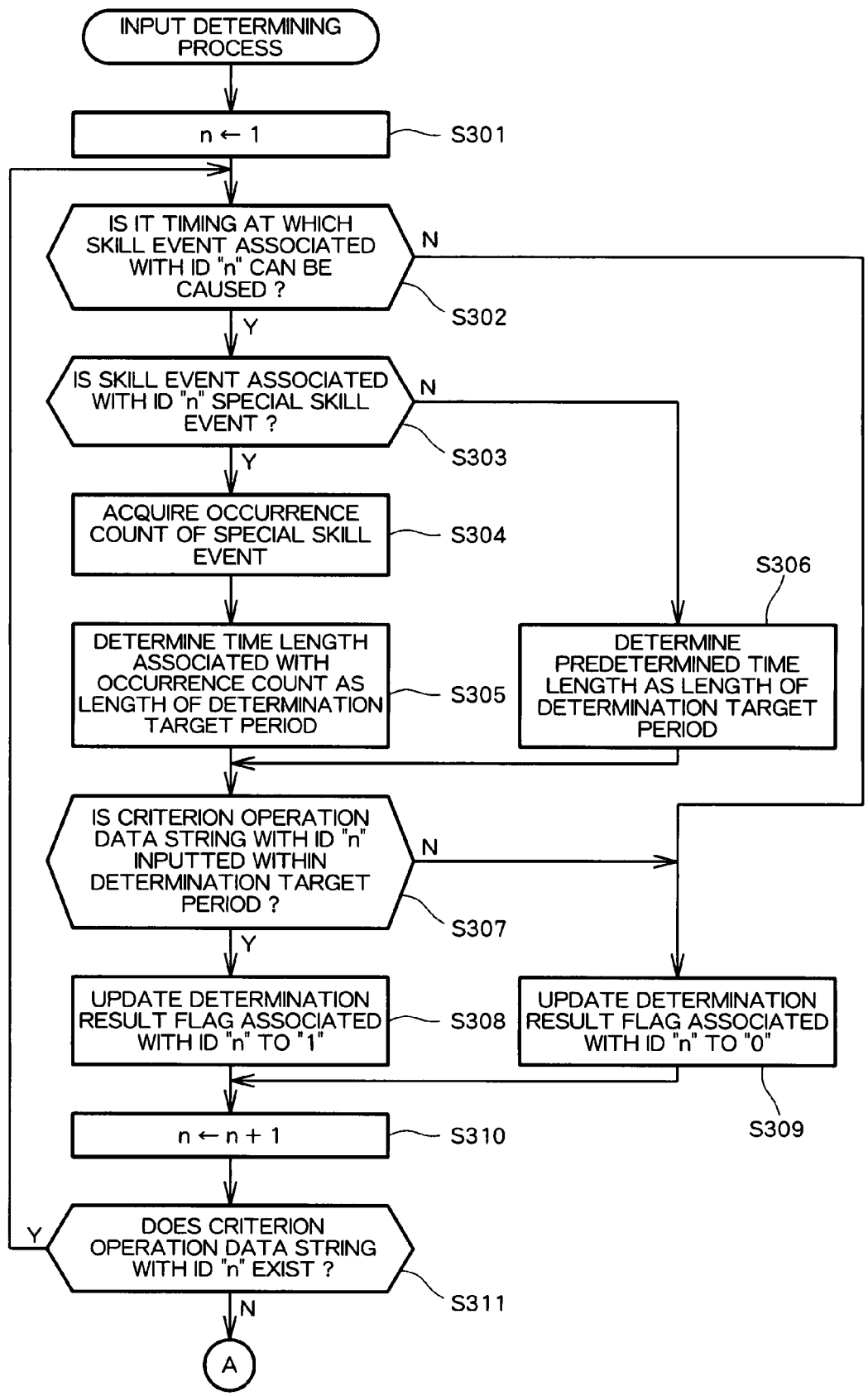
FIG. 13 is a flowchart showing another example of the input determining process.

Moreover, in the input determining process, instead of the processes of Steps S201 through S207, processes shown in FIG. 13 may be executed.

In the processes illustrated in FIG. 13, to begin with, the variable n is initialized to "1" (S301). After that, it is determined whether or not it is the time at which the skill event associated with ID"n" can be caused (S302). Those processes are executed in the same way as Steps S201 and S202 of FIG. 9.

When it is determined that it is the time at which the skill event associated with ID"n" can be caused, the determination criterion changing unit 54 determines whether or not the skill event associated with ID"n" is the special skill event (special skill A event or special skill B event) (S303).

The determination criterion changing unit 54 determines, when it is determined that the skill event is not the special skill event, the length of the determination target period as the predetermined time length (e.g., T1) (S306). On the other hand, when it is determined that the skill event is the special skill event, the determination criterion changing unit 54 refers to the occurrence count table, thereby acquiring the occurrence count associated with the combination of the player corresponding to the object controller and the special skill event associated with ID"n" (S304). Then, the determination criterion changing unit 54 refers to the occurrence count condition table and thus determines, as the length of the determination target period, the time length associated with the occurrence count condition satisfied by the acquired occurrence count (S305).

After that, the determining unit 52 determines whether or not the criterion operation data string specified by ID"n" is inputted within the determination target period (S307). Then, the determining unit 52 updates the determination result flag field associated with ID"n" to "0" or "1", according to the result of the determination (S308 and S309). After that, the determining unit 52 increments the variable n (S310), and determines whether or not the criterion operation data string specified by ID"n" exists (S311). If it is determined that the criterion operation data string specified by ID"n" exists, the process of Step S302 is executed again. Moreover, if it is determined that the criterion operation data string specified by ID"n" does not exist, the processes of Steps S208 through S216 shown in FIG. 10 are executed. Note that the processes of Steps S307 through S311 are executed in the same way as the processes of Steps S203 through S207 in FIG. 9.

With the structure as described above, the length of the determination target period can be changed based on the degree of proficiency of the player. In other words, even with the structure as described above, the degree of difficulty of the occurrence of the special skill event can be changed based on the degree of proficiency of the player.

Here, in this embodiment, in determining whether or not the criterion operation data string is inputted, if the input times of two consecutive items of operation data are apart from each other by the interval of the predetermined period (criterion interval) or longer, it is not determined that the criterion operation data string is contained (refer to Steps S307 and S203). Thus, the length of the determination target period may be varied by changing the length of this criterion interval rather than the length of the whole determination target period. The degree of difficulty of the occurrence of the special skill event may also be changed as described above. For example, the degree of difficulty of the occurrence of the special skill event may be raised by shortening the criterion interval. The degree of difficulty of the occurrence of the special skill event may be lowered by elongating the criterion interval.

Note that the present invention is not limited to the embodiment discussed above.

For instance, the degree of difficulty of the occurrence of the special skill event may be lowered based on the degree of proficiency of the player. For example, in the 1-player mode, the degree of difficulty of the occurrence of the special skill event is decreased based on the degree of proficiency of the player, whereby the player can more easily cause the special skill event to occur. With this structure, an increase in the level of the player or of the operation object character may be staged. Further, for example, in the 2-player mode, if the occurrence count of the special skill event of one player reaches a predetermined count, the operation procedures (criterion operation data string) for causing the occurrence of the special skill event may be changed to easier procedures for the other player, or the determination target period may be elongated for the other player. Thus, based on the degree of proficiency of the one player, the degree of difficulty of the occurrence of the special skill event for the other player may be decreased. Accordingly, even when the players are different in their degrees of proficiency, a fervent battle can be held therebetween.

Further, for instance, in the 2-player mode, the degree of difficulty of the occurrence of the special skill event for at least one player may be changed based on a difference between the occurrence count of the special skill event of one player and the occurrence count of the special skill event of the other player. Even with such change, a fervent battle can be held between the players who have different degrees of proficiency.

Moreover, for example, the statistic acquisition unit 56 may store a date and time of the occurrence of each special skill event (special skill A event or special skill B event) or a date and time when it is determined that each criterion operation data string has been inputted by the determining unit 52, and may acquire, as "the statistics related to the results of the determinations made in the past by the determining unit 52", the occurrence count of each special skill event during, a predetermined period (e.g., period from a predetermined time ago up to the present time) or the determination count by which the determining unit 52 has determined that each criterion operation data string has been inputted. Furthermore, for example, the statistic acquisition unit 56 may acquire the occurrence count of each special skill event or the determination count by which the determining unit 52 had determined that each criterion operation data string has been inputted, in the plays (matches or battles) of the latest predetermined number of times.

Moreover, for instance, the degree of difficulty of the occurrence of a certain special skill event may further be changed based on the occurrence count of another special skill event or the determination count by which the determining unit 52 has determined that a criterion operation data string corresponding to the another special skill event has been inputted. For instance, the degree of difficulty of the occurrence of the special skill A event may be changed based on a total of the occurrence count of the special skill A event and the occurrence count of the special skill B event.

Yet further, for example, the game to which the present invention is applied is not limited to the game described above. The present invention can be applied to games other than fighting game and also to games in which three or more players participate.

Further, for example, in the description above, a description has been given of an example where the present invention is applied to the game system comprising one game device 10.

However, the present invention can be applied to a game system (network game system etc.) comprising a plurality of game device 10.

Still further, in the description given above, the programs are supplied to the home game machine 11 from the DVD-ROM 25 serving as an information storage medium, and may also be distributed to homes and the like via the communication network. FIG. 14 is a diagram illustrating a whole structure of a program distribution system using the communication network. A program distribution method according to the present invention will be described with reference to FIG. 13. As illustrated in the figure, a program distribution system 100 includes a game database 102, a server 104, a communication network 106, a personal computer 108, a home game machine 110, and a PDA (personal digital assistant) 112. A program distribution device 114 includes the game database 102 and the server 104. The communication network 106 includes, e.g., the Internet or a cable TV network. In this system, the game database (information storage medium) 102 stores programs identical to the content stored in the DVD-ROM 25. Then, a prospective consumer makes a game distribution request by use of the personal computer 108, the home game machine 110, the PDA 112, or the like, whereby the request is transferred to the server 104 via the communication network 106. Then, the server 104 reads the programs from the game database 102 in response to the game distribution request, and transmits the programs to the game distribution requester such as the personal computer 108, the home game machine 110, the PDA 112, etc. Herein, the game is distributed in response to the game distribution request. However, the server 104 may transmit the game in a one-sided manner. Further, all components of the program necessary to realize a game are not necessarily sent at once (collective distribution), and only a necessary component of the program according to an aspect of the game may be sent (divided distribution). Thus, the game is distributed via the communication network 106, whereby the prospective consumer can easily obtain the programs.

The invention claimed is:

1. A game system including one or more controllers, comprising:
   determining means for determining whether a criterion operation data string indicative of a sequence of operation procedures required to cause a special skill event to occur, the sequence of operation procedures being performed on the one or more controllers, has been inputted from the one or more controllers within a determination target period; and
   game event generation means for generating a game event comprising the special skill event for a two-player competitive fighting game according to a result generated by the determination made by the determining means,
   wherein the determining means executes a change of a length of the determination target period within which the criterion operation data string has been inputted, to adjust a level of difficulty when a flag indicates the criterion operation data string being inputted within a determination target period and when an occurrence count condition indicates that the special skill event for said two player competitive fighting game has occurred a prescribed number of times, based on a result of a statistic related to a plurality of results of a plurality of past determinations of at least one of the one or more controllers, and
   wherein the special skill event is associated with the criterion operation data string, and wherein the determining and the generating are performed in a processor.

2. A game system according to claim 1, wherein
   the determining means executes, when determining whether the criterion operation data string has been inputted from one of the one or more controllers, the change of the length of the determination target period based on a result of the statistic of said one of the one or more of the controllers.

3. A game system according to claim 1, wherein
   when determining whether the criterion operation data string has been inputted from one of the one or multiple controllers, the determining means executes the change of the length of the determination target period based on a result of the statistic of a controller other than said one of the one or more controllers.

4. A game system according to any one of claims 1 through 3, wherein
   the determining means executes the change based on a number of times the game event generation means has generated the game event according to the result of the determination on the at least one of the one or more controllers.

5. The game system of claim 1, wherein said game event is associated with a plural ones of said criterion operation data string.

6. The game system of claim 1, wherein said determination target period is reduced when said number of times that said game event has been generated exceeds a count, indicative of an increased skill level of said player.

7. The game system according to claim 1, wherein the game system includes a first controller and a second controller,
   the game system executes the two-player competitive fighting game between a first player using the first controller and a second player using the second controller,
   the determining means includes means for determining whether the criterion operation data string has been inputted from the first controller within the determination target period, and means for determining whether the criterion operation data string has been inputted from the second controller within the determination target period; and
   the game event generation means includes means for generating the game event according to a result of the determination with respect to an input from the first controller, and means for generating the game event according to a result of the determination with respect to an input from the second controller; and
   the determining means includes means for changing, based on a difference between said result of said statistic of the first controller and said result of said statistic of the second controller, at least one of the length of the determination target period used in the determination with respect to the input from the first controller and the length of the determination target period used in the determination with respect to the input from the second controller.

8. A control method for a game system including one or more controllers, comprising:
   determining whether a criterion operation data string indicative of a sequence of operation procedures required to cause a special skill event to occur, the sequence of operation procedures being performed on the one or more controllers, has been inputted from the one or more controllers within a determination target period; and generating a game event comprising the special skill event for a two-player competitive fighting game according to a result of the determining, wherein the determining includes executing a change of a length of the determination target period within which the criterion operation data string has been inputted, to adjust a level of difficulty when a flag indicates the criterion operation data string being inputted within a determination target period and when an occurrence count condition indicates that the special skill event for said two player competitive fighting game has occurred a prescribed number of times, based on a result of a statistic related to a plurality of results of a plurality of past determinations of at least one of the one or more controllers, and further wherein the special skill event is associated with the criterion operation data string, and wherein the determining and the generating are performed in a processor.

9. The method of claim 8, further comprising:
determining whether the special skill event is associated with said criterion operation data string can be caused, and if so, determining said length of said determination target period in accordance with an occurrence count of said special skill event for a player operating said one or more controllers.

10. The method of claim 9, further comprising:
determining whether said occurrence count condition has been satisfied with respect to said special skill event, and if so, incrementing a special skill occurrence counter, and updating on-occurrence event information.

11. The method of claim 8, wherein the game system includes a first controller and a second controller,
the game system executes the two-player competitive fighting game between a first player using the first controller and a second player using the second controller,
the determining whether a criterion operation data string has been inputted from the one or more controllers includes determining whether the criterion operation data string has been inputted from the first controller within the determination target period, and determining whether the criterion operation data string has been inputted from the second controller within the determination target period; and
the generating includes generating the game event according to a result of the determination with respect to an input from the first controller, and generating the game event according to a result of the determination with respect to an input from the second controller; and
the determining whether a criterion operation data string has been inputted from the one or more controllers includes changing, based on a difference between said result of said statistic of the first controller and said result of said statistic of the second controller, at least one of the length of the determination target period used in the determination with respect to the input from the first controller and the length of the determination target period used in the determination with respect to the input from the second controller.

12. A non-transitory computer readable information storage medium storing a program for causing a computer to function as a game system including one or more controllers, and also to function as:
determining means for determining whether a criterion operation data string indicative of a sequence of operation procedures required to cause a special skill event to occur, the sequence of operation procedures being performed on the one or more controllers, has been inputted from the one or more controllers within a determination target period; and
game event generation means for generating a game event comprising the special skill event for a two-player competitive fighting game according to a result of the determining, wherein the determining means executes a change of a length of the determination target period within which the criterion operation data string has been inputted, to adjust a level of difficulty when a flag indicates the criterion operation data string being inputted within a determination target period and when an occurrence count condition indicates that the special skill event for said two player competitive fighting game has occurred a prescribed number of times, based on a result of a statistic related to a plurality of results of a plurality of past determinations of at least one of the one or more controllers, and further wherein the special skill event is associated with the criterion operation data string, and wherein the determining and the generating are performed in a processor.

13. The computer readable medium of claim 12, where said determining comprises:
determining means for determining whether the special skill event associated with said criterion operation data string can be caused, and whether said criterion operation data string has been inputted within said determination target period; and
if said skill event can be caused and said criterion operation data string was inputted within said determination target period, providing an update so that said generating can be performed.

14. The computer readable medium of claim 13, further comprising:
determining means for determining whether said special skill event associated with said criterion operation data string can be caused, and if so, determining said length of said determination target period in accordance with an occurrence count of said special skill event for a player operating said one or more controllers.

15. The computer readable medium of claim 13, further comprising:
determining means for determining whether an occurrence count condition has been satisfied with respect to the special skill event, and if so, incrementing a special skill occurrence counter, and updating on-occurrence event information.

16. The computer readable information storage medium of claim 12, wherein the game system includes a first controller and a second controller,
the game system executes the two-player competitive fighting game between a first player using the first controller and a second player using the second controller,
the determining means includes means for determining whether the criterion operation data string has been inputted from the first controller within the determination target period, and means for determining whether the criterion operation data string has been inputted from the second controller within the determination target period; and
the game event generation means includes means for generating the game event according to a result of the determination with respect to an input from the first controller, and means for generating the game event according to a result of the determination with respect to an input from the second controller; and the determining means includes means for changing, based on a difference between said result of said statistic of the first controller and said result of said statistic of the second controller, at least one of the length of the determination target period used in the determination with respect to the input from the first controller and the length of the determination target period used in the determination with respect to the input from the second controller.

* * * * *